United States Patent Office 2,884,379
Patented Apr. 28, 1959

2,884,379

RUST INHIBITOR COMPOSITION

Harry W. Rudel, Roselle, and Marion Gargisa, Elizabeth, N.J., assignors to Esso Research and Engineering Company, a corporation of Delaware No Drawing. Application June 30, 1954
Serial No. 440,546

8 Claims. (Cl. 252—48.6)

This invention relates to rust inhibitors and to lubricating oil compositions containing them. More particularly, the invention relates to mineral oil rust preventives containing rust inhibitor additives which are highly effective in small concentrations. Still more particularly, the invention relates to branched chain alkyl thioethers of $C_2$ to $C_4$ saturated fatty acids.

In U.S. Patent #2,216,751, and U.S. Patent #2,354,550, issued to Rosen, there is described thioether substituted monobasic organic acids and derivatives thereof which have been found useful as mentioned in said patents for various purposes. The patents referred to cover a large number of compounds, some of which include complex alkyl radicals. The lower members of this class of materials are only slightly soluble in mineral oil, and while the higher members have been described as being moderately soluble they are actually far less soluble than is desirable.

Compounds of this type are effective rust inhibitors when added to mineral oils. A method of improving the alkyl thio ether acid rust inhibitors is described in U.S. Patent 2,474,604, issued to Wasson and Zimmer in 1949, which teaches the concomitant use of the alkyl thio ether acids and certain esters of polyhydric alcohols. By means of this combination, the alkyl thio ether acids may be employed successfully in rust inhibitor compositions in very low concentrations. In any case, however, the insolubility of the prior art compounds made it impossible to make oil concentrates of the thio ether acids, a factor which has mitigated severely against their widespread use.

It has now been found and forms the object of this invention that a certain class of alkyl thio ether acids are completely soluble in mineral oils and, in addition, have outstanding qualities of rust inhibition. This class of compounds, more completely described hereinafter, may be generally classed as the branched chain alkyl thio ethers of $C_2$ to $C_4$ saturated fatty acids.

To more completely describe the instant invention, reference is made to the following examples.

EXAMPLE I

Tridecyl alcohol was prepared as follows:

An olefinic polymer of propylene which may contain a small amount of butylene is fractionated to obtain a heart cut of substantially pure $C_{12}$ olefin. This $C_{12}$ olefin is subjected to the Oxo process which involves the carbonylation of the olefin in the presence of a carbonyl catalyst, usually cobalt carbonyl, with carbon monoxide and hydrogen at a temperature within the range of from about 200° to about 400° F. and at a pressure of from about 100 to about 300 atmospheres. After the carbonylation stage, an aldehyde having one more carbon atom than the starting olefin is obtained, and this aldehyde is then hydrogenated at temperatures of from 150°–750° F. and at pressures of from 100–300 atmospheres, in the presence of a hydrogenation catalyst (copper, nickel, nickel sulfide etc.) to obtain the $C_{13}$ oxo (tridecyl) alcohol.

The tridecyl alcohol may be converted to the corresponding mercaptan by reaction with hydrogen bromide at about 125° C. to form the bromide, washing the product with sulfuric acid to remove any unreacted alcohol, washing with water to remove acidity, and treatment of the bromide with an alkali metal mercaptan, such as sodium or potassium mercaptan. This treatment is carried out under reflux conditions in the presence of ethanol, preferably. If desired, hydrogen chloride and zinc chloride may be used instead of the hydrogen bromide to obtain the chloride which is then treated as above.

A solution of 44 g. of sodium hydroxide dissolved in 100 cc. of water is added to 108 g. of tridecyl mercaptan ($C_{13}$ Oxo SH) diluted with 150 cc. of 99% isopropyl alcohol. The addition is accomplished slowly with stirring and with external cooling. There is then added 52 g. of monochloro acetic acid dissolved in 100 cc. of water. This reactant is also added slowly and the reaction temperature is maintained at between about 20° and 25° C. by means of external refrigeration. After soaking for one hour at room temperature, the mixture is acidified with 85 cc. of concentrated hydrochloric acid. An insoluble oil obtained is separated, washed three times with water, blown dry with nitrogen at 100° C. and filtered. 127.1 g. of a product is obtained which contains 10.67% sulfur. This material is tridecyl mercapto acetic acid.

A 40% concentrate of the tridecyl mercapto acetic acid prepared as above was prepared by agitation, while warming gently, of a mixture of 40 parts of the acid with 60 parts of a solvent refined Mid-Continent distillate having a viscosity at 210° F. of 45 SUS. This concentrate was used to prepare blends of various concentrations.

The blends prepared as above were evaluated as rust preventives for steam turbine oils in the presence of both distilled water and synthetic sea water. The ASTM designation of this test is D665–46T. In this test a standard steel specimen is maintained in contact with a rapidly stirred oil (300 cc.) and water (30 cc.) mixture for 48 hours at 140° F. The extent of rusting is then noted.

Results of the tests on the blends of the product in a phenol extracted Mid-Continent lube stock are given below.

Table I

| Concentration of Tridecylmercapto Acetic Acid (Wt. Percent) | Extent of Rusting | |
|---|---|---|
| | Distilled Water | Synthetic Sea Water |
| None | Heavy | Heavy. |
| 0.01% | None | Medium. |
| 0.03% | None | None. |
| 0.05% | None | None. |

It will be seen that as little as 0.01 weight percent of the mercapto acid was very effective in preventing rusting of these steel panels and that perfect results were obtained with as little as 0.03 weight percent.

Another illustration of the effectiveness of this material as a rust inhibitor is given by the results of the following static type of tests.

In this series of tests, 300 cc. of a distillate fuel having a boiling range of 360 to 642° F. and a gravity of 34.6 A.P.I. and 30 cc. of distilled water were mixed and stirred at room temperature. A polished steel test strip was immersed in the mixture so that the extent of rusting on the portion of the strip immersed in both the water and oil layers could be periodically noted. The results of this test are set out in Table II below.

Table II

| Conc. of Tridecyl Mercapto Acetic Acid (Weight Percent) | Extent of Rusting | | | |
|---|---|---|---|---|
| | Two Days' Storage | | Thirty Days' Storage | |
| | Water Layer | Oil Layer | Water Layer | Oil Layer |
| None | Heavy | Heavy | Very Heavy | Very Heavy. |
| 0.005 | Trace | None | Light | Trace. |
| 0.01 | None | None | None | None. |
| 0.02 | None | None | None | None. |

It will be noted that concentrations of the material of this invention as low as 0.005% gave only trace rusting in the oil layer after 30 days' storage and that 0.01 weight percent of the material gave no rusting whatsoever.

Similar results are obtained when using hexadecyl mercapto acetic acid prepared from $C_{16}$ Oxo mercaptan.

In the following series of experiments the solubility of various mercapto acetic acids answering the above description were compared with straight chain alkyl mercapto fatty acids. It is to be seen by the data given below that the straight chain alkyl acetic acids represented by lauryl and cetyl mercapto acetic acids are soluble in oil only up to about 3% whereas the highly branched chain alkyl mercapto fatty acids are completely soluble in all proportions.

Table III

| Alkyl Mercapto Acetic Acid | Configuration of Alkyl Group | Solubility in Lubricating Oil [1] |
|---|---|---|
| Tridecyl ($C_{13}$ Oxo)[2] | Branched Chain | Completely Miscible. |
| Hexadecyl ($C_{16}$ Oxo)[2] | do | Do. |
| Lauryl ($C_{12}$) | Straight Chain | About 3 wt. percent. |
| Cetyl ($C_{16}$) | do | Less than 3%. |

[1] Phenol extracted Mid-Continent lubricating oil.
[2] The tridecyl mercapto acetic acid mentioned above was derived from tridecyl mercaptan, which was prepared from the $C_{13}$ alcohol obtained by subjecting $C_{12}$ olefin, predominantly tetrapropylene, to the Oxo reaction. The tridecyl group was mostly tetra-methyl nonyl. The hexadecyl mercapto acetic acid mentioned above is similarly derived from $C_{15}$ olefin, predominantly pentapropylene, via the Oxo process. The hexadecyl group is believed to be mostly penta-methyl undecyl. In both cases, mixtures of various methyl substituted groups are present, and the point of substitution of the methyl group on the chain is not always definitely known.

The alkyl mercapto fatty acids of this invention may be generically grouped under the following formula

R—S—R'—COOH

In the formula, R' is the aliphatic hydrocarbon radical of a saturated fatty acid containing from about 2 to about 4 carbon atoms. Operable fatty acids include acetic, propionic, butyric acids and the like. The critical feature of this invention resides in the definition of R. It is essential that the R group of the formula be of branched chain configuration and contain from about 13 to about 16 carbon atoms. Especially desirable alkyl groups are those derived from alcohols or mercaptans which are prepared in the well known Oxo process. This process involves the carbonylation of olefins under high temperatures and pressures and in the presence of a carbonylation catalyst such as the heavy metal carbonyl, particularly a cobalt carbonyl. The olefin is subjected to the action of carbon monoxide and hydrogen in the presence of the catalyst at temperatures in the range of from about 200° F. to about 400° F., at pressures in the order of from 100 to about 300 atmospheres. After the carbonylation of the olefin, the aldehyde obtained is hydrogenated in the presence of a hydrogenation catalyst at temperatures of about 150 to about 750° F. and at about 100 to 300 atmospheres' pressure. The resulting highly branched chain alcohol may then be converted to the desired mercaptans by any of the methods known to the art.

Since the alcohol resulting from the Oxo process contains 1 more carbon atom than the starting olefin and since the desired alkyl group for the mercapto ether acids of this invention contain from 13 to 16 carbon atoms, a preferred olefinic feed stock for the Oxo process is an olefin polymer containing from 12 to 15 carbon atoms in branched chain configuration. Particularly desirable feed stocks are the tetra and penta propylene polymers. Other olefins such as di-, tri- and tetra-isobutylene, as well as copolymers of propylene and the butylenes may of course be used so long as the resulting alkyl group obtained contains from about 13 to about 16 carbon atoms.

Although a preferred method for the preparation of the alkyl thioether acids is given above, any of the various methods known to the art may be utilized without departing from the spirit of the instant invention.

The rust inhibiting characteristics of the branched chain alkyl thioether acids of this invention may be utilized in any base stock chosen. For instance, these materials effectively inhibit rusting when blended in amounts varying from about 0.005 wt. percent to 0.20 weight percent with mineral oils of viscosities within the range of from 35 vis./100 SUS to 200 vis./210 SUS as well as synthetic oils of comparable viscosities, etc.

Other additive materials may also be blended with the alkyl thioether acids to enhance other desirable characteristics of the compositions. Such materials as oiliness agents, extreme pressure additives, thickening agents, pour point depressors, detergents and the like may be blended to obtain the desired final composition.

To summarize briefly, this invention relates to new and useful compositions of matter and to lubricating oil solutions containing them. The invention particularly relates to alkyl thio ethers of saturated fatty acids wherein the alkyl group forming the alkyl radical is of highly branched chain nature and contains from about 13 to about 16 carbon atoms. Due to the unlimited solubility of these materials in lubricating oil, blends containing a major amount of the alkyl thio ether acids are extremely useful. These concentrates as they are known to the art, may contain from about 20% to about 60% by weight of the acids and are utilized by the lubricant blender to form lubricating oil compositions containing the desired proportion of the active ingredient.

What is claimed is:

1. As a new composition of matter, an oil soluble material consisting essentially of an isomeric mixture of acids of the formula:

RSR'COOH wherein R represents branched chain isomers of $C_{13}$ to $C_{16}$ alkyl groups, said alkyl groups being derived from an isomeric mixture of branched chain alcohols prepared by the carbonylation of a $C_{12}$ to $C_{15}$ olefin at temperatures of about 200° to 400° F., under pressures of about 100 to 300 atmospheres in the presence of a cobalt catalyst followed by catalytic hydrogenation at temperatures of about 150° to 750° F. and under pressures of about 100 to 300 atmospheres, and where R' is a straight chain $C_1$ to $C_3$ hydrocarbon group.

2. A composition according to claim 1, wherein R represents branched chain isomers of $C_{13}$ alkyl groups derived from an isomeric mixture of alcohols prepared from tetrapropylene.

3. A composition of matter according to claim 1, wherein R represents branched chain isomers of a $C_{16}$ alkyl group derived from an isomeric mixture of alcohols prepared from pentapropylene.

4. A composition according to claim 1, wherein R' is $CH_2$.

5. A rust-inhibiting composition of matter comprising a major proportion of a mineral oil containing about 0.005 to about 0.20 weight percent, based on the weight of the total composition, of a rust preventive consisting essentially of an isomeric mixture of acids having the formula:

RSR'COOH wherein R represents branched chain isomers of $C_{13}$ to $C_{16}$ alkyl groups, said alkyl groups being derived from an isomeric mixture of branched chain alcohols prepared by the carbonylation of a $C_{12}$ to $C_{15}$ olefin at temperatures of about 200° to 400° F., under pressures of about 100 to 300 atmospheres in the presence of a cobalt catalyst followed by catalytic hydrogenation at temperatures of about 150° to 750° F. and under pressures of about 100 to 300 atmospheres, and wherein R' is a straight chain $C_1$ to $C_3$ hydrocarbon group.

6. A rust-inhibiting composition of matter according to claim 5, wherein R' is $CH_2$.

7. A mineral lubricating oil containing about 25 to 65 weight percent of an isomeric mixture of acids of the formula:

RSR'COOH wherein R represents branched chain isomers of $C_{13}$ to $C_{16}$ alkyl groups being derived from an isomeric mixture of branched chain alcohols prepared by the carbonylation of a $C_{12}$ to $C_{15}$ olefin at temperatures of about 200° to 400° F., under pressures of about 100 to 300 atmospheres in the presence of a cobalt catalyst followed by catalytic hydrogenation at temperatures of about 150° to 750° F. and under pressures of about 100 to 300 atmospheres, and wherein R' is a straight chain $C_1$ to $C_3$ hydrocarbon group.

8. A mineral lubricating oil composition according to claim 7, wherein R' is $CH_2$.

References Cited in the file of this patent
UNITED STATES PATENTS

| | | |
|---|---|---|
| 2,216,751 | Rosen | Oct. 8, 1940 |
| 2,602,816 | Gregory et al. | July 8, 1952 |